United States Patent
Carlson et al.

(10) Patent No.: US 7,455,488 B2
(45) Date of Patent: Nov. 25, 2008

(54) HAND POWER TOOL (75) Inventors: Carl Christian Carlson, Vernon Hills, IL (US); Marco Braun, Stuttgart-Botnang (DE); Roshilawati Razlan, Penang (MY); Rezwan Iskandar Jalil, Simpang Ampat (MY); Wooi Ken Thong, Penang (MY)

(73) Assignee: Robert Bosch GmbH, Stuttgart (DE)

( * ) Notice: Subject to any disclaimer, the term of this patent is extended or adjusted under 35 U.S.C. 154(b) by 266 days.

(21) Appl. No.: 10/572,787

(22) PCT Filed: Oct. 28, 2004

(86) PCT No.: PCT/EP2004/052703

§ 371 (c)(1),
(2), (4) Date: Mar. 21, 2006

(87) PCT Pub. No.: WO2005/058542

PCT Pub. Date: Jun. 30, 2005

(65) Prior Publication Data

US 2007/0065245 A1 Mar. 22, 2007

(30) Foreign Application Priority Data

Dec. 18, 2003 (DE) .............................. 103 59 420

(51) Int. Cl.
*B23C 1/20* (2006.01)

(52) U.S. Cl. ................................................. 409/182

(58) Field of Classification Search ................. 409/181, 409/182, 134, 210; 30/381; 451/359; 173/128, 173/217

See application file for complete search history.

(56) References Cited

U.S. PATENT DOCUMENTS

| 3,991,964 A | | 11/1976 | Christopher |
| 4,319,860 A | * | 3/1982 | Beares ........................ 409/182 |
| 4,445,811 A | * | 5/1984 | Sanders ....................... 409/182 |
| 5,273,089 A | * | 12/1993 | Fuchs et al. .................. 409/182 |
| 5,308,201 A | * | 5/1994 | Wilson et al. ................ 409/182 |
| 5,853,274 A | * | 12/1998 | Coffey et al. ................ 409/182 |
| 5,913,645 A | | 6/1999 | Coffey |
| 6,203,253 B1 | | 3/2001 | Perrault |
| 6,488,455 B1 | * | 12/2002 | Staebler et al. ............. 409/182 |
| 6,896,451 B2 | * | 5/2005 | Oberheim .................... 409/182 |
| 6,951,232 B2 | * | 10/2005 | McDonald et al. .......... 409/182 |
| 6,991,008 B2 | * | 1/2006 | McDonald et al. .......... 409/182 |
| 2002/0043294 A1 | | 4/2002 | McDonald et al. |
| 2002/0164223 A1 | * | 11/2002 | Ryan et al. .................. 409/182 |
| 2003/0002948 A1 | * | 1/2003 | Hathcock et al. ............ 409/182 |
| 2003/0206779 A1 | | 11/2003 | Kopras et al. |

FOREIGN PATENT DOCUMENTS

DE 196 37 690 3/1997
GB 2 304 622 3/1997

* cited by examiner

*Primary Examiner*—Dana Ross
(74) *Attorney, Agent, or Firm*—Michael J. Striker (57) ABSTRACT

A hand power tool has a housing and a cutting tool bit, as well as a guard, which embraces the tool bit and is coupleable to the housing and axially adjustable relative to it, wherein the housing and the guard means, in a first adjusting position, are positionable axially freely and in a second adjusting position, guided by an adjusting element are positionable axially finely and lockably to one another, wherein the adjusting element is configured to prevent free axial displacement of the guard in the second adjusting position.

24 Claims, 6 Drawing Sheets

HAND POWER TOOL

CROSS-REFERENCE TO RELATED APPLICATIONS

This application claims priority under 35 U.S.C. 119(a)-(d) to German Patent Application Number DE 103 59 420.5, filed 18 Dec. 2003.

BACKGROUND OF THE INVENTION

1. Field of the Invention

The present invention is based on a hand power tool I and adjusting means.

2. Description of Related Art

From German Patent DE 196 37 690 C2, a hand power tool designed as a top spindle molder with cutting depth adjustment is known that permits relatively safe and convenient adjustment of the cutting depth, but a continuously variable rapid adjustment by hand is not possible.

BRIEF SUMMARY OF THE INVENTION

The present invention having the characteristics of claim 1 has the advantage that with it, rapid and precise adjustment of the cutting depth can be done in a safely monitorable way, and the means provided for it can be produced and installed simply and economically and are sturdy and easy to operate.

Because the adjusting positions between the housing and the guard means can be quickly changed, it is possible to finely adjust the cutting depth position safely and precisely immediately after a rapid coarse adjustment.

Because the adjusting positions can be changed between coarse and fine adjustment by means of a relative motion between the housing and the guard means, the cutting depth adjustment can be done especially simply and quickly.

Because the guard means is designed as a supporting foot which annularly embraces the housing and can be switched over into two predetermined rotary positions that define one fine adjustment stage and one coarse adjustment stage for varying the axial position of the housing relative to the supporting foot, it is possible to switch over the hand power tool in adjusting the cutting depth safely and simply.

Because the two rotary positions are limited in overlooking fashion, directly next to one another, with a minimal rotational course of the housing relative to the supporting foot, the rotational position can be adjusted in a quickly variable way.

Because overlooking means between the housing and the supporting foot make any change in the adjustment stage audible and feelable, these means secure the housing and the supporting foot against unintentional change.

Because the housing has a steplike collar onto which the supporting foot can be slipped, and the outer contour of the housing merges smoothly with that of the completely slipped-on supporting foot, and the minimal telescoping extension position and hence a maximum cutting depth for the tool bit are set in this position of the housing relative to the supporting foot, it is possible for the mutual rotation of the supporting foot and the housing in the switchover operation to be safely felt and monitored by the user's hand in the transition region between the supporting foot and the housing.

Because a depth stop is located between the housing and the supporting foot and this depth stop in the first adjustment stage does not but in the second adjustment stage does adjustably engage between the housing and the supporting foot, it is possible to make an axial coarse adjustment of the housing relative to the supporting foot in the first adjustment stage, from which, after a switchover to the second adjustment stage, the final cutting depth can be finely adjusted by rotating the depth stop.

Because the depth stop is designed as a screw bolt, on one end of which a control wheel is seated in a manner fixed against relative rotation, with which control wheel the depth stop is located rotationally drivably and axially secured in the supporting foot, it can axially finely adjust the housing relative to the supporting foot in the fine adjustment stage by rotation by hand, and in the first adjustment stage it remains disengaged from the inside of the housing, and furthermore, upon release of the housing from the supporting foot, it can remain secured in captive fashion in the supporting foot.

Because the control wheel passes through the supporting foot to the outside in a manually operable way, and the screw bolt, over nearly half its length, rests longitudinally parallel in a groove in an inside of the wall of the supporting foot in form-locking fashion and with its protruding longitudinal region on the diametrically opposite side is associated with a parallel outer longitudinal housing groove, the depth stop can be adjusted from outside especially safely - without the risk of injury to the user's hand by the tool bit.

Because next to the one longitudinal housing groove there is a further longitudinal housing groove, particularly with a female thread that fits the thread of the depth stop and into which female thread the screw bolt can be placed longitudinally, a fine adjustment of the housing relative to the supporting foot can be done upon placement of this bolt in the one longitudinal housing groove, and upon its placement in the other longitudinal housing groove, a free axial adjustment of the housing relative to the supporting foot can be done by hand.

Because the center spacing of the longitudinal housing grooves is less than the groove diameter, the switchover travel for changing the adjustment stages is especially short.

Because overlooking means are located between the longitudinal housing grooves at the transition from one to the other and positionally secure the screw bolt in overlooking fashion in its applicable longitudinal housing groove, an unintentional change of the adjustment stages is precluded.

Because one of the longitudinal housing grooves has fitting threaded means that can engage the inside of the screw bolt upon rotation of the screw bolt, via actuation of the control wheel, replicable fine adjustment of the housing relative to the supporting foot is possible.

Because the other of the longitudinal housing grooves embraces the screw bolt with radial play without engaging it, the housing can be easily adjusted easily relative to the supporting foot axially between the two end points of the axial position in the second adjustment stage, as it were by free axial displacement.

Because a parallel bolt, as the overlooking means between the longitudinal housing grooves, seeks to brace itself in spring prestressed fashion radially movably outward longitudinally, that is, toward the supporting foot, counter to the screw bolt of the depth stop, the result is the creation of a large-area, securely effective overlooking means between the supporting foot and the housing.

Because the collar of the housing and/or the upper edge, braceable thereon, of the sleevelike shaft of the supporting foot extends obliquely, the correct reinsertion of the housing into the supporting foot after separate manipulation is safe to operate. Because the adjusting positions, particularly by clamping means, are detachably lockable and thus axially and radially fixable, the cutting depth of the hand power tool is adjustable in a secured way.

Because the supporting foot is dimensioned such that with its aid the hand power tool can be set down, in freestanding fashion, on a horizontal, level surface, working with the hand power tool can be done especially precisely and without tilting.

Because the housing is limited relative to the supporting foot in its axial end positions upon longitudinal displacement by stops, and in particular by a bayonet mount, unintentional release or loss of the supporting foot from the housing or vice versa is precluded.

Because scale means for monitoring the cutting depth are located between the housing and the supporting foot, the cutting depth position can be adjusted in a securely monitorable and replicable way, particularly in the fine adjustment stage.

Because it is designed as a top spindle molder, and the adjusting positions can be associated with a respective predetermined cutting depth, it can be adjusted in an especially time-saving way and can be manipulated safely.

Because the adjusting means, described above in terms of their advantages, serve to alter or fix two parts, which are arranged in telescoping fashion with respect to one another, relative to one another, they can also be employed especially advantageously—with their own inventive value—not only in hand power tools but also in other areas of use, where both rapid and especially precise adjustment of the relative position is necessary.

BRIEF DESCRIPTION OF THE DRAWINGS

The invention is described below in further detail in terms of an exemplary embodiment in conjunction with the drawings.

Shown are

DETAILED DESCRIPTION OF THE INVENTION

Figure 1:
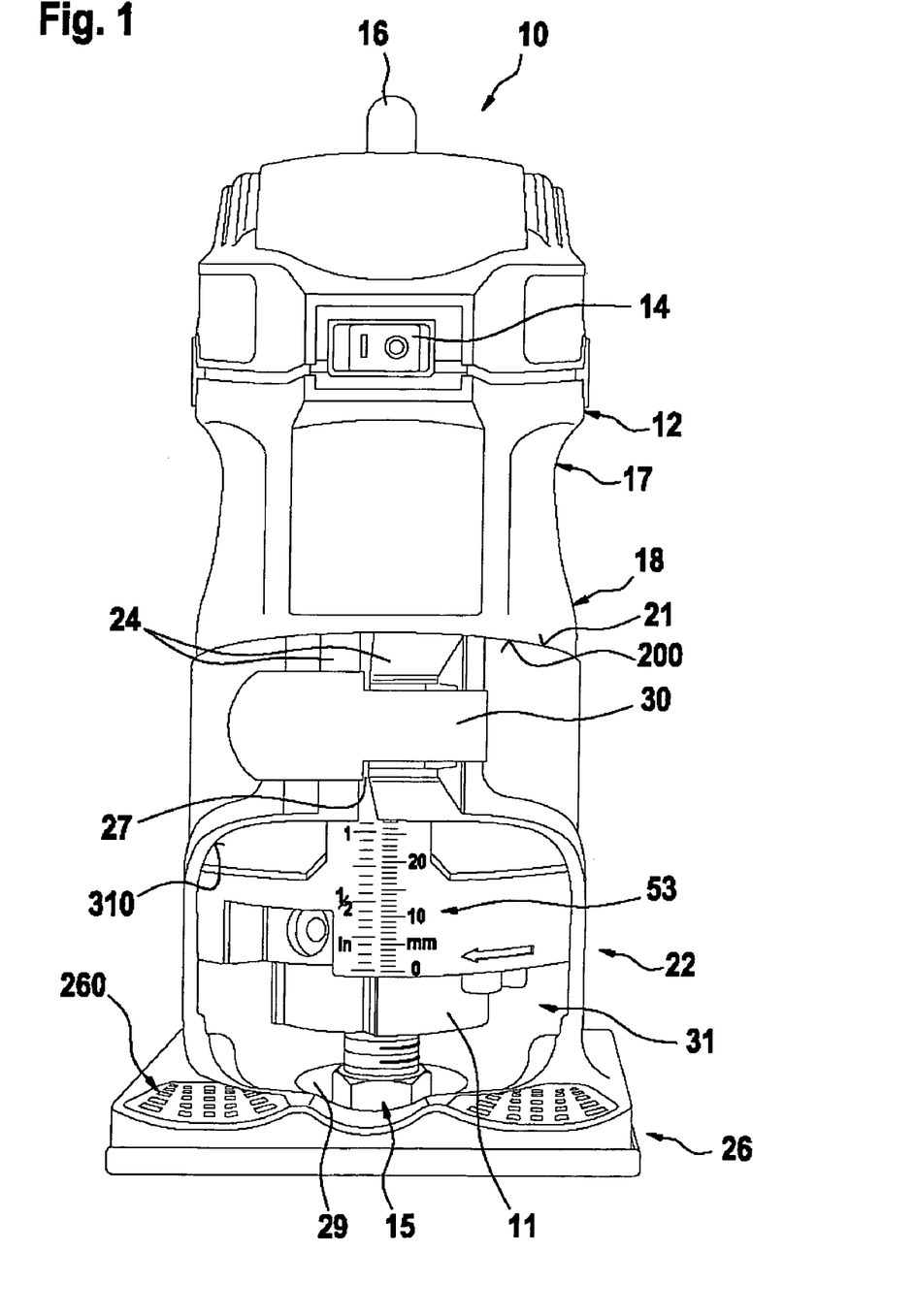
FIG. 1, the hand power tool from the front.

A hand power tool 10 shown from the front in FIG. 1 is designed as an electrically operable top spindle molder, which comprises a housing 12 that at the front has a toggle switch 14 for switching it on and off, and from whose lower free end 11 a rotating tool bit 15 for metal-cutting machining of workpieces protrudes.

The cylindrical housing 12, in the uppermost quarter of its length, has a waist 17, which can easily be grasped with one hand and which with its radial protrusion fits, axially bracingly, into the hand holding it. The lower half of the housing 12 has a slightly smaller outer diameter than the upper region and with the smaller diameter forms a collar 20 (FIG. 3), which can be inserted in telescoping fashion into a hollow-cylindrical supporting foot 22. The transition between the collar 20 and the upper region of the housing 12 forms a protrusion or feelable edge 200.

Figure 3:
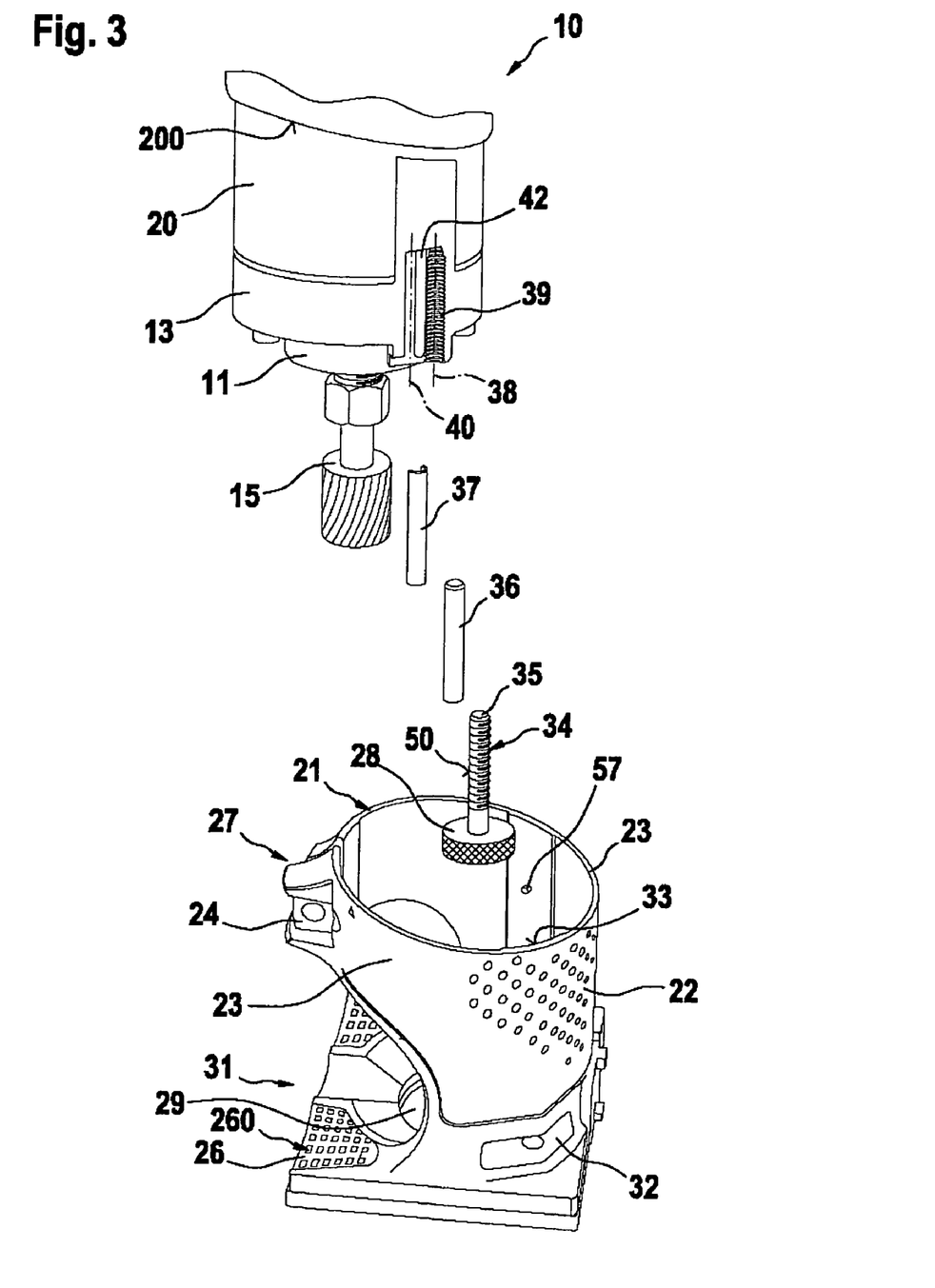
FIG. 3, the supporting foot and the hand power tool, shown in an exploded view, taken apart axially.

This edge 200, located between the collar 20 and the region above it having the larger diameter of the housing 12, extends obliquely downward toward the rear—like the upper edge of the supporting foot 22.

An electrical connection cord 16 emerges from the upper housing region at the rear, with a slight slant upward. Because of the direction in which it emerges and its inclination, it is reliably kept spaced apart from the engagement point of the tool bit 15 and a workpiece, without being a hindrance to the work as cables that emerge vertically upward are.

The hollow-cylindrical supporting foot 22 has a vertical, tubular supporting foot wall 23, which is longitudinally slotted at the front, and at the slot 27, two lateral, forward-protruding, perforated clamping tabs 24 are formed. A clamping screw 25 (FIG. 2) can be inserted through these tabs, transversely to the longitudinal axis of the supporting foot 22. If the clamping screw is tightened, the two clamping tabs 24 move toward one another and in the process seek to close the slot 27. In so doing, they clamp the collar 20 of the housing 12, seated in the supporting foot 22, firmly-securing it against rotation and axial displacement. Thus a cutting depth of the tool bit 15, once set, is securely fixed against unintentional change. The clamping screw 25 is a fast-clamping screw with a pivot lever 30 with an eccentric region, not identified by reference numeral, of the kind known for instance for adjusting the saddle height of bicycles, and can be released and tightened by means of the pivot lever 30. The pivot lever 30 of the clamping screw 25 is pivoted against the supporting foot 22 in the clamped state and is largely pulled inside the contour of the supporting foot. As a result, when the top spindle molder 10 is being used, and for instance when it meets edges of a workpiece, an unintentional upward pivoting of the pivot lever 30 is precluded.

Below the clamping tabs 24, the supporting foot wall 23 opens, over its full width, downward as far as the foot plate 26, to form a windowlike front recess 31. The foot plate 26 on the lower end of the supporting foot 22 is essentially square and protrudes past the outer contour of the cylindrical supporting foot 22 to the side, the rear, and the front. Its area is dimensioned such that the top spindle molder 10 can be set down with the supporting foot 22, in freestanding fashion, securely and stably on a level support.

The cutting depth for the tool bit 15 is monitorably adjustable by means of a scale 53 on the lower edge of the housing 12; the scale position can be read off relative to the adjacent upper edge 310 of the windowlike front recess 31 as a reference edge.

The foot plate 26 has a vertical opening 29, designed as a circular hole, for the passage through it of the tool bit 15 downward into a workpiece to be machined. By axial adjustment of the top spindle molder 10 or housing 12 relative to supporting foot 22, the depth to which the tool bit 15 plunges into a tool to be machined is adjustable.

On the outside, at the back and side, the housing 12 and the supporting foot 22 are provided, in the grip region 18, with regularly distributed, hemispherical indentations 19, which have a diameter of approximately 2 to 3 mm and which improve the grip and thus the safety of using the top spindle molder 10. A grip region with an especially nonslip fluting 260 made up of rectangular impressions is also formed on the top side of the foot plate 26.

Figure 2:
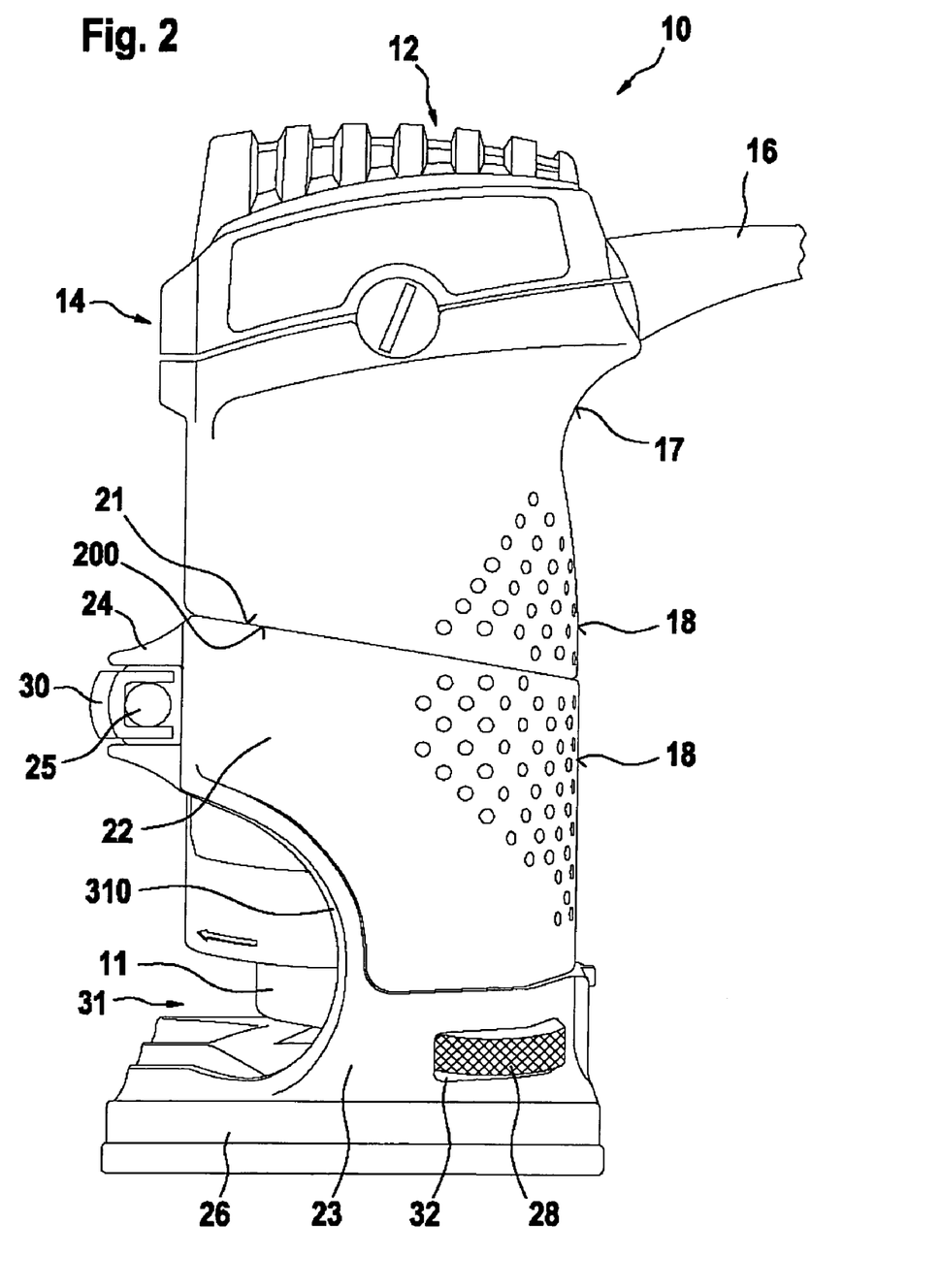
FIG. 2, the hand power tool from the left.

FIG. 2 shows the left-hand side of the top spindle molder 10, in which in particular—going beyond FIG. 1—the a power cord 16 extending obliquely upward at the rear, can be seen along with the housing 12, ribbed transversely at the top, and the clamping tabs 24 protruding from the front with the pivot lever 30. The grip region 18 is furthermore visible, with the hemispherical indentations 19 and the edge 21, descending obliquely to the rear, of the supporting foot 22 or correspondingly the protruding edge 200 at the collar 20, as well as the shape of the front recess 31 with the archlike edge and the transition to the relatively far forward-protruding foot plate 26.

Laterally at the back, a control wheel 28 can be seen in the lower region of the supporting foot 22; it emerges from a transverse slot 32 in the supporting foot wall 23 and—although not visible here—has a threaded bolt 35 (FIG. 3), which extends in the interior between the housing 12 and the supporting foot wall 23 and serves as a depth stop 34 (FIG. 3).

FIG. 3 is an exploded view with the top spindle molder 10 positioned above the supporting foot 22; of the top spindle molder, only the lower region with the collar 20, the lower free end 11, and the tool bit 15 can be seen. The edge 200 between the upper region of the housing 12 and the collar 20 is clearly visible. At the supporting foot 22, the clamping screw 25 has been removed, making the design of the perforated clamping tabs 24 visible along with the slot 27 between the two clamping tabs. Also visible is the upper edge 21 of the supporting foot 22 and the transverse slot 32 for the control wheel 28 in the lower region of the supporting foot 22 above the base plate 26. The depth stop 34 with the control wheel 28 has been removed from its inserted position in the inside face of the supporting foot wall 23. For removing it, a retaining screw, not shown, that engages the control wheel in the middle must be removed; in the installed position, it secures the depth stop 34 on the supporting foot 22 against unintentional loosening.

The depth stop 34 is designed in its upper region as a screw bolt 35 with a thread 50. The screw bolt 35 is intended for selective entry into a first or second longitudinal housing groove 38, 40 in the outer wall of the housing 12 in the region of the collar 20. The two longitudinal housing grooves 38, 40 extend parallel to the screw bolt 35, or to its longitudinal groove 33 (FIG. 5) in the inside face of the supporting foot wall 23. Approximately centrally between and parallel to the longitudinal housing grooves 38, 40, an overlooking bolt 36 is placed in a slot 42 in the housing wall 13 in the region of the collar 20 in such a way that it cannot fall out radially outward through the suitably narrowly dimensioned slot 42; it is held in prestressed fashion from behind by a leaf spring 37 radially outward in the slot 42.

If the housing 12 has been inserted axially in telescoping fashion as intended into the supporting foot 22, the screw bolt 35 rests in one of the longitudinal grooves 38, 40. If the housing 12 is rotated slightly relative to the supporting foot 22 such that the screw bolt 35 is supposed to emerge laterally outward from the pair of longitudinal housing grooves 38, 40, this direction of rotation is blocked. Conversely, however, the housing 12 can be rotated counter to the force of the leaf spring 37 and of the overlooking bolt 36; after a suitable rotational course, the threaded bolt 35 snaps audibly into whichever is the adjacent longitudinal housing groove 38, 40. Before the housing 12 is rotated relative to the supporting foot 22, the pivot lever 30 of the clamping screw 25 must be put into its release position, so that the slot 27 between the clamping tabs 24 opens and the force lock between the supporting foot 22 and the housing 12, or collar 20, is released.

The first longitudinal housing groove 38 has a thread 39, which fits the thread 50 of the screw bolt 35. If the longitudinal housing groove 38 is in engagement with the screw bolt 35, then upon its rotation, or rotation of the control wheel 28, the housing 12 is axially adjusted relative to the supporting foot 22. If the second longitudinal housing groove 40 is in overlooking engagement with the screw bolt 35, no form or force lock becomes operative between it and the housing 12. As a result, in this position, the housing 12 can easily be displaced back and forth axially by hand relative to the supporting foot 22 between two defined axial end positions. In this position, a coarse preselection of the cutting depth can be done simply and quickly by axial sliding. Once the cutting depth position has been coarsely adjusted, the housing 12 should be rotated relative to the supporting foot 22 such that the screw bolt 35 enters overlockingly into the first longitudinal housing groove 38, so that in this position, by rotation of the control wheel 28, the threads 39, 50 engaging one another bring about an axial force transfer with finely meterable longitudinal adjustment. Once the desired cutting depth position has been reached, the housing 12 is locked relative to the supporting foot 22 by pivoting of the pivot lever 30 into its clamping position, so that neither a rotary nor an axial motion between these two parts is possible. Thus the cutting depth position of the housing 12 relative to the supporting foot 22 is set. Depending on the cutting depth selected, the tool bit 15 protrudes outward more or less far past the lower edge of the foot plate 26, with a corresponding cutting depth into the workpiece to be machined, onto which workpiece the foot plate 26 is to be set.

To the right in the viewing direction below the control wheel 28, a radially inward-protruding cam 57 seated on the inside of the supporting foot wall 23 can be seen, which is intended for secure engagement with a bayonet groove 55 (FIG. 8) of the housing 12.

Figure 4:
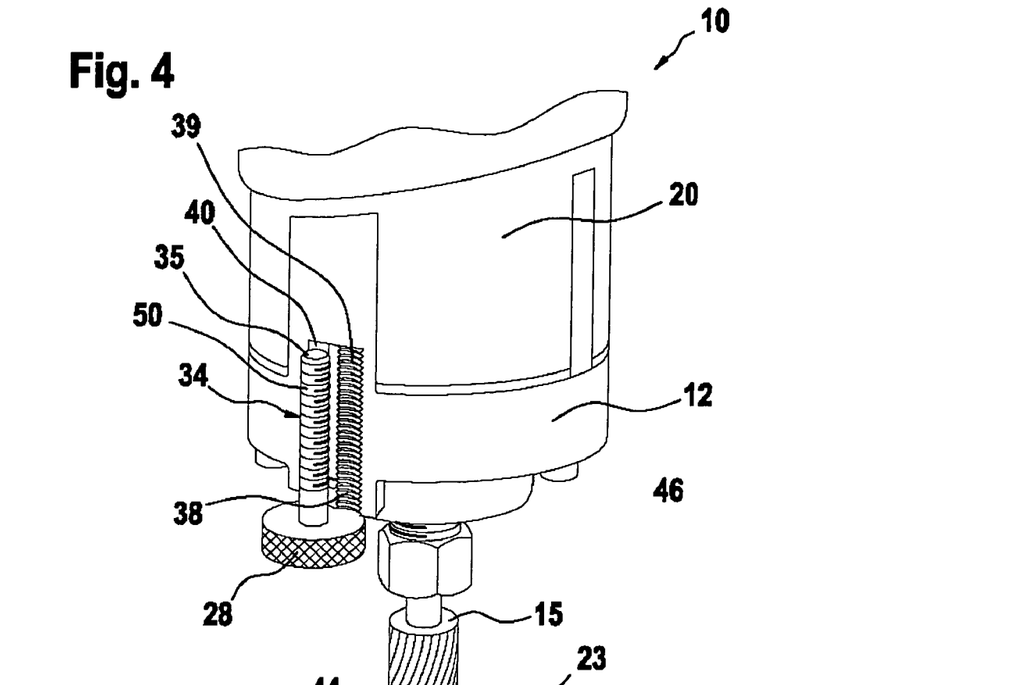
FIG. 4, the hand power tool without the supporting foot and the depth stop.

FIG. 4 shows a side view of the top spindle molder 10 in the region of the collar 20, with a depth stop 34—put in place for the sake of demonstration—which had previously been removed from its installed position in the supporting foot 22. This depth stop 24 is placed in the second longitudinal housing groove without a thread 40 and axially freely displaceably therein and cannot take on any locking or force transfer function between the supporting foot 22 and the housing 12. This demonstrates the coarse adjustment position, in which the housing 12 is limitedly freely displaceable relative to the supporting foot 22.

In the first longitudinal housing groove 38, which is parallel to the second longitudinal housing groove 40, the thread 39 can be seen, which upon engagement of the depth stop 34 prevents an axial displacement between the housing 12 and the supporting foot 22 by means of forces from outside exerted against these two parts and permits such displacement only by means of rotation of the control wheel 28.

The other details mentioned in connection with the preceding drawings will not be repeated here again; it will be mentioned that the reference numerals are the same.

Figure 5:
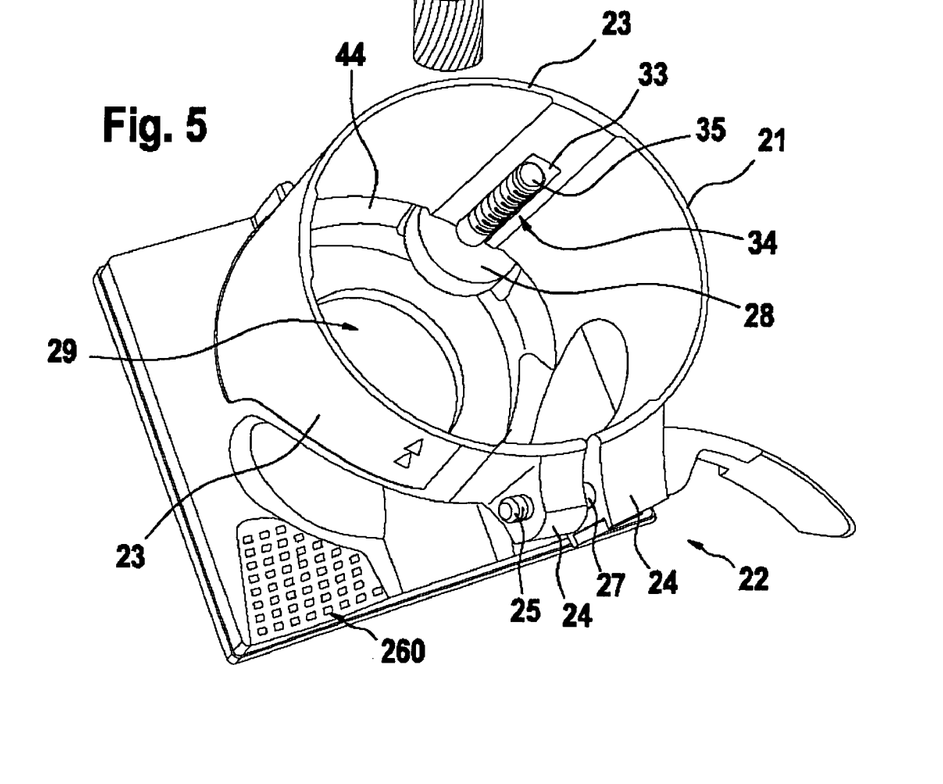
FIG. 5, the supporting foot from above with the depth stop.

FIG. 5 shows the detail of the supporting foot 22; going beyond the preceding drawing figures, the depth stop 34 is shown in its inserted position on the inside face of the supporting foot wall 23, and the screw bolt 35 rests axially nondisplaceably with radial play and freely rotatably in the longitudinal groove 33 of the supporting foot wall 23. Moreover, the slot 27 between the clamping tabs 24 in the supporting foot 22 is also clearly visible.

The other details described in conjunction with the preceding figures will not be repeated again here.

Figure 6:
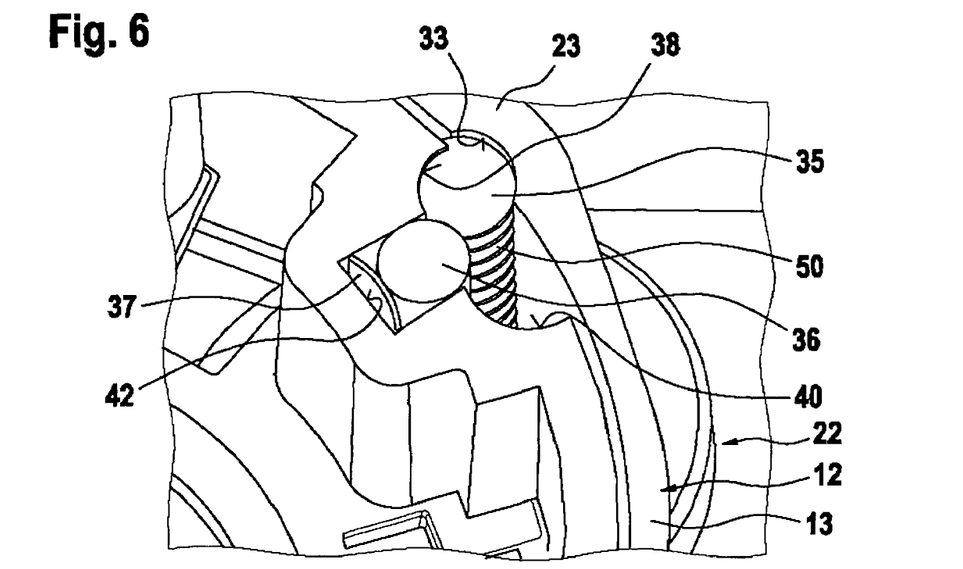
FIG. 6, an enlarged cross section between the supporting foot and the housing with the depth stop in the fine adjustment stage.

FIG. 6 shows an enlarged detail of the cross section between the supporting foot wall 23 and the housing wall 13 in the region of the longitudinal housing grooves 38, 40 with the threaded bolt 35 in place, and on the opposite side, the longitudinal groove 33 in the supporting foot wall 23. This makes the overlooking and action position of the screw bolt 35 clear.

Figure 7:
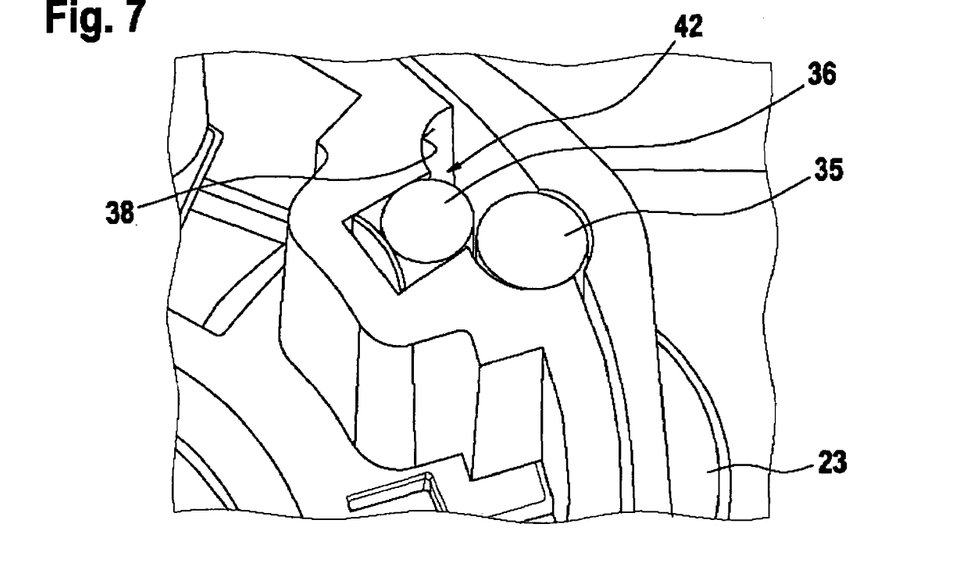
FIG. 7, the view of FIG. 6 in the coarse adjustment stage.

FIG. 7 shows the same details as FIG. 6, but with the housing 12 rotated relative to the supporting foot 22; the threaded bolt 35 rests in the second longitudinal housing groove 40 and makes a free displacement of the housing 12 possible relative to the supporting foot 22.

Figure 8:
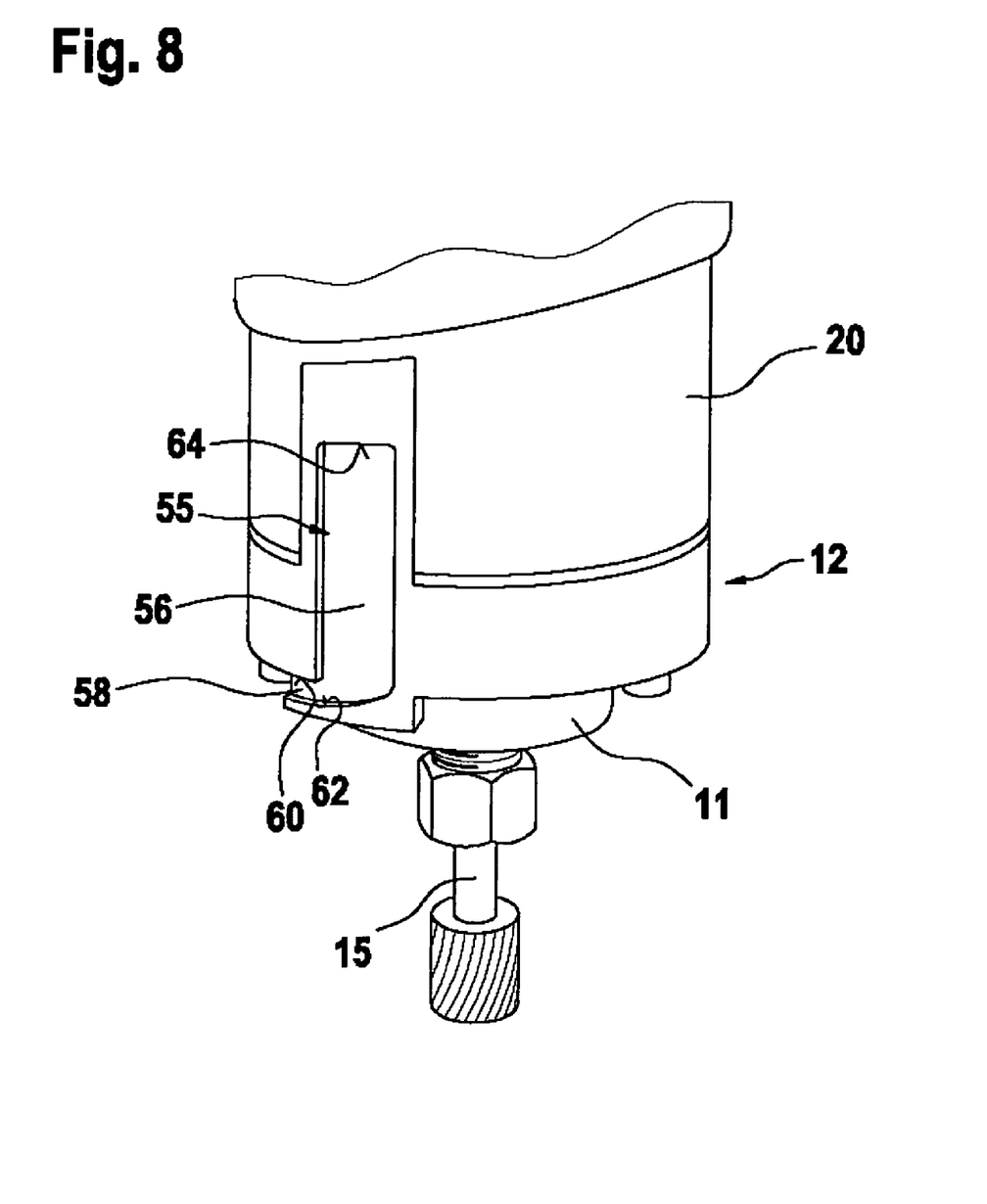
FIG. 8, a further side view of the housing.

FIG. 8 shows a further sectional view of the housing 12 with its collar 20, looking toward an L-shaped bayonet groove 55. This groove is composed of an upper, wide region 56, which extends vertically, and merges toward the bottom with a narrow, angled region 58. The bayonet groove 55 is engaged by a cam 57 as a locking or stop element, which is seated on the inside of the hollow-cylindrical supporting foot wall 23 (FIG. 9) and protrudes radially inward.

The cam 57 is put into engagement with the bayonet groove 55 in the following way: First, the housing 12 should be placed axially on the supporting foot 22. In the process, the region 58, opening laterally downward, of the bayonet groove 55 is slipped over the cam 57, until a further axial displacement of the housing 12 relative to the supporting foot 22 is stopped, because the cam 57 strikes the upper groove wall 60 of the region 58. By corresponding rotation of the housing 12 relative to the supporting foot 22, the cam 57 is guided along the groove wall 60 until it reaches the upper region 56.

Once this position of the cam 57 is reached, the housing 12 is longitudinally freely displaceable relative to the supporting foot 22, as long as the threaded bolt 35 is simultaneously resting in the second longitudinal housing groove 40. So that the cam 57 will not hinder the adjustment of the rotary positions of the housing 12 relative to the supporting foot 22 and is axially freely movable in every rotary position, the upper region 56 of the bayonet groove 55 is designed as suitably wide.

For limiting the axial motion between the supporting foot 22 and the housing 12, an upper groove end 64 and the lower side wall 62 of the region 58 of the bayonet groove 55 are used, which simultaneously determine the outermost axial end positions, and on which the cam 57 rests in its respective end position. This prevents an unintentional release of the supporting foot 22 from the housing 12 when the clamping screw 25 is open.

To facilitate the assembly of the supporting foot 22 with the housing 12, arrow-shaped symbols, not identified by reference numerals, are impressed into the housing 12 and/or the supporting foot 22; these symbols mark housing regions that belong to one another or are to be aligned with one another as such, and at the same time they describe a preconditional assembly motion.

The invention claimed is:

1. A hand power tool, having a housing (12) and a cutting tool bit (15), as well as having a guard means, which embraces the cutting tool bit (15) and is coupleable to the housing (12) and axially adjustable relative to it, wherein the housing (12) and the guard means, in a first adjusting position, are positionable axially freely and in a second adjusting position, guided by adjusting means, are positionable axially finely and lockably to one another, wherein the adjusting means is configured to prevent free axial displacement of the guard means in the second adjusting position and wherein the adjusting positions are rapidly changeable by means of a relative motion between the guard means and the housing (12).

2. The hand power tool in accordance with claim 1, wherein the relative motion is a rotary motion between the guard means and the housing (12), in particular limited by a short rotational course.

3. The hand power tool in accordance with claim 1, wherein the guard means is designed as a supporting foot (22), which annularly embraces the housing (12) and can be put into two predetermined rotary positions, which define one fine adjustment stage and one coarse adjustment stage for varying the axial position of the housing (12) relative to the supporting foot (22).

4. The hand power tool in accordance with claim 3, wherein the two rotary positions are limited in overlocking fashion, in particular directly next to one another, with a minimal rotational course of the housing (12) relative to the supporting foot (22).

5. The hand power tool in accordance with claim 3, wherein overlocking means (36, 37) that secure every adjustment stage against unintentional change are located between the housing (12) and the supporting foot (22).

6. The hand power tool in accordance with claim 3, wherein the housing (12) has a collar, onto which the supporting foot (22) can be slipped in telescoping fashion, and the outer contour of the housing (12) merges flush with that of the completely slipped-on supporting foot (22), and in this position of the housing (12) relative to the supporting foot (22), the minimal telescoping extension position and hence a maximum cutting depth for the tool bit (15) are set.

7. The hand power tool in accordance with claim 3, wherein located between the housing (12) and the supporting foot (22) is a depth stop (34), which in the first adjustment stage does not and in the second adjustment stage does lockingly engage the inside of the housing (12) and the supporting foot (22).

8. The hand power tool in accordance with claim 7, wherein the depth stop (34) is designed as a screw bolt, on one end of which a control wheel (28) is seated in a manner fixed against relative rotation, with which control wheel the depth stop (34) is located rotatably and axially secured in the supporting foot (22).

9. The hand power tool in accordance with claim 8, wherein the control wheel (28) reaches outward, in particular in a manually operable way, through the supporting foot (22), and in particular its sleevelike wall (23), and the screw bolt (35) rests in form-locking fashion over approximately half its length in a longitudinally parallel groove (33) in the inside of the wall (23) of the supporting foot (22) and with its radially protruding lengthwise region rests on the diametrically opposite side in an outer longitudinal housing groove (38) that is parallel to the groove (33).

10. The hand power tool in accordance with claim 3, wherein it is capable of being set down, in freestanding fashion, on a horizontal, level surface, with the aid of the supporting foot (22).

11. The hand power tool in accordance with claim 3, wherein the housing (12) and the supporting foot (22) are secured against unintentional release from one another, in particular by a bayonet mount or stop means.

12. The hand power tool in accordance with claim 3, wherein scale means (53) are located between the housing (12) and the supporting foot (22) for indicating the cutting depth.

13. The hand power tool in accordance with claim 3, wherein the supporting foot (22), particularly on the top side of its foot plate (26), has at least one indentation with an upward-protruding edge and with a nonslip surface structure which in particular is provided with rectangular impressions and which serves as a finger rest with a touch guard protecting the finger against the tool bit (15) when the supporting foot (22) is guided and held by hand in milling work.

14. The hand power tool in accordance with claim 1, wherein the adjusting positions are axially and radially fixable and releasable, in particular by clamping means (25, 30).

15. The hand power tool in accordance with claim 1, wherein it is designed as a top spindle molder, and the adjusting positions can be associated with a preterminded cutting depth.

16. The hand power tool in accordance with claim 1, wherein a power cord (16) emerges from the housing (12) radially, to the rear, and angled upward.

17. A hand power tool, having a housing (12) and a cutting tool bit (15), as well as having a guard means designed as a supporting foot (22), which embraces the cutting tool bit (15) and is coupleable to the housing (12) and axially adjustable relative to it, wherein:

the housing (12) and the supporting foot (22), in a first adjusting position, are positionable axially freely and in a second adjusting position, guided by adjusting means, are positionable axially finely and lockably to one another;

the adjusting means is configured to prevent free axial displacement of the guard means in the second adjusting position;

located between the housing (12) and the supporting foot (22) is a depth stop (34), which in the first adjustment stage does not and in the second adjustment stage does lockingly engage the inside of the housing (12) and the supporting foot (22);

the depth stop (34) is designed as a screw bolt, on one end of which a control wheel (28) is seated in a manner fixed against relative rotation, with which control wheel the depth stop (34) is located rotatably and axially secured in the supporting foot (22);

the control wheel (28) reaches outward, in a manually operable way, through the supporting foot (22), and its sleevelike wall (23), and the screw bolt (35) rests in form-locking fashion over approximately half its length in a longitudinally parallel groove (33) in the inside of the wall (23) of the supporting foot (22) and with its radially protruding lengthwise region rests on the diametrically opposite side in an outer longitudinal housing groove (38) that is parallel to the groove (33); and a further longitudinal housing groove (40), with the same radius of curvature, is located next to the one longitudinal housing groove (38), and the screw bolt (35) can be longitudinally placed in this further longitudinal housing groove.

18. The hand power tool in accordance with claim 17, wherein the longitudinal housing grooves (38, 40) are directly next to each other and can be put into a parallel overlocking engagement with the screw bolt (35) selectively by rotating the supporting foot (22) relative to the housing (12).

19. The hand power tool in accordance with claim 18, wherein the center spacing of the longitudinal housing grooves (38, 40) is less than twice their radius of curvature.

20. The hand power tool in accordance with claim 19, wherein overlocking means are located between the longitudinal housing grooves (38, 40) and seek to keep the screw bolt (35) positionally secure in prestressed fashion in its respective longitudinal housing groove (38, 40).

21. The hand power tool in accordance with claim 20, wherein one of the longitudinal housing grooves (38, 40) has fitting threaded means (50) or the like that are capable of engaging the inside of the screw bolt (35).

22. The hand power tool in accordance with claim 21, wherein the other of the longitudinal housing grooves (38, 40) embraces the screw bolt (34) with little contact, and in particular with radial play.

23. The hand power tool in accordance with claim 22, wherein between the longitudinal housing grooves (38, 40), as overlocking means a bolt (36) is braceable, radially spring-prestressed outward, longitudinally against the screw bolt (35), and in particular is retained in captive fashion in a slot in the housing wall (13).

24. The hand power tool in accordance with claim 23, wherein the collar (20) of the housing (12) and/or the upper edge (21), braceable thereon, of the sleevelike shaft of the supporting foot (22) extends obliquely.

* * * * *